(No Model.) 2 Sheets—Sheet 1.

J. FLYNN.
DROPPING AND MARKING ATTACHMENT FOR CORN PLANTERS.

No. 361,935. Patented Apr. 26, 1887.

WITNESSES
Percy White.
John H. Shaw.

INVENTOR
John Flynn
J. W. Flenner
Attorney

N. PETERS, Photo-Lithographer, Washington, D. C.

(No Model.) 2 Sheets—Sheet 2.
J. FLYNN.
DROPPING AND MARKING ATTACHMENT FOR CORN PLANTERS.
No. 361,935. Patented Apr. 26, 1887.
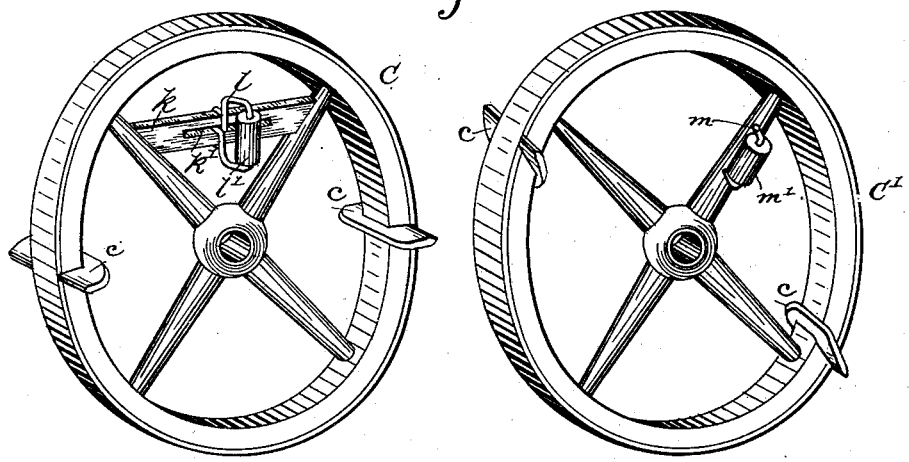
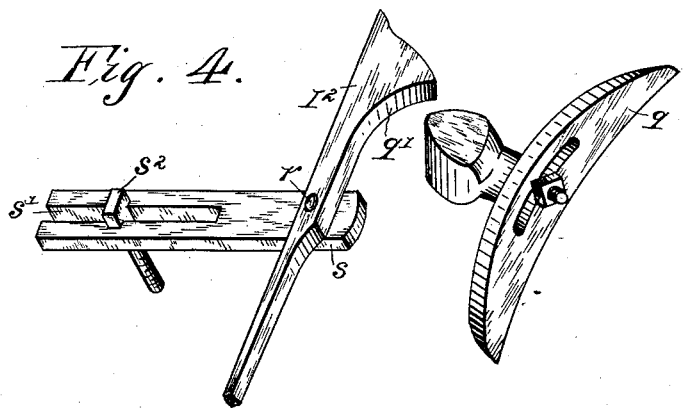
Witnesses
Percy White.
John H. Shaw,
Inventor
John Flynn
By his Attorney

UNITED STATES PATENT OFFICE.

JOHN FLYNN, OF VAIL, IOWA.

DROPPING AND MARKING ATTACHMENT FOR CORN-PLANTERS.

SPECIFICATION forming part of Letters Patent No. 361,935, dated April 26, 1887.

Application filed January 19, 1887. Serial No. 224,810. (No model.)

*To all whom it may concern:*

Be it known that I, JOHN FLYNN, a citizen of the United States, residing at Vail, in the county of Crawford and State of Iowa, have invented certain new and useful Improvements in Dropping and Marking Attachments for Corn-Planters; and I do hereby declare the following to be a full, clear, and exact description of the invention, such as will enable others skilled in the art to which it appertains to make and use the same.

My invention relates to machines for planting corn and other seeds and for marking the ground at the points where the seed has been dropped; and the object of my invention is to produce a simple and direct-acting mechanism for operating the dropping-slide, and also for accurately marking the ground at exactly the points where the seed has been deposited.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1:
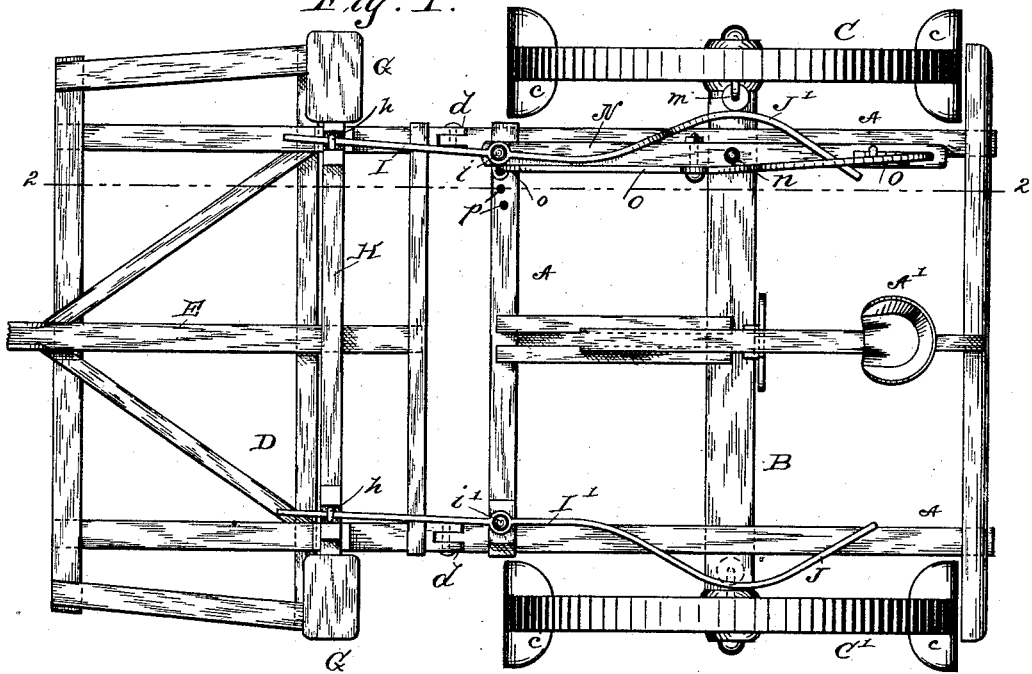
Figure 2:
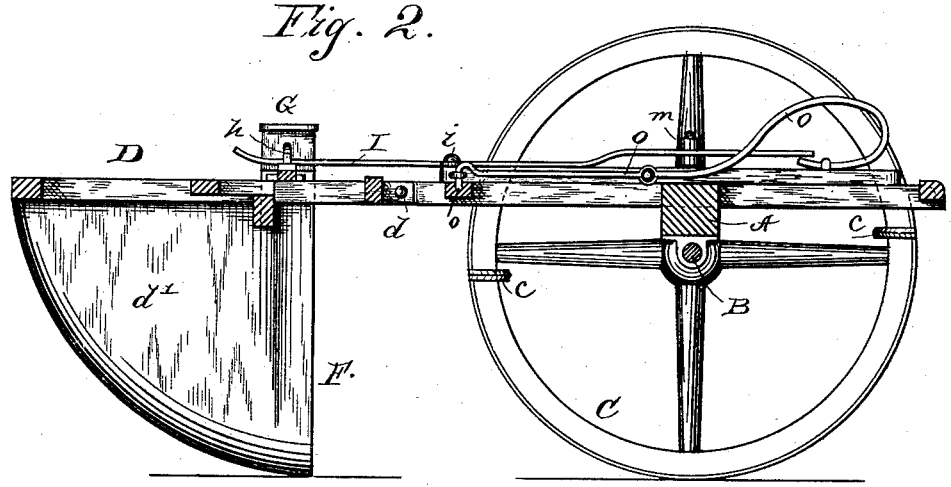

Figure 1 is a plan view of my improved machine. Fig. 2 is a vertical longitudinal section of the same on the line 2 2 of Fig. 1. Fig. 3 is a detached view of the carrying-wheels and their attachments. Fig. 4 is a detached view illustrating a modified detail of construction.

In the said drawings, A designates the main frame of the machine, which is rectangular in form and mounted upon the axle B, which carries the wheels C C'. This main frame carries the driver's seat A', and to its front end is hinged, at $d\ d$, the seeder-frame D, which is supported upon shoes or runners $d'$, and upon which the tongue E is secured. At the rear end of the shoes $d'$ are located the drills F, which communicate at their upper ends with the seed-hoppers G in the usual manner. Between the hoppers G extends the dropping-slide H, which is arranged to reciprocate longitudinally beneath the hopper-bottoms for discharging and cutting off the seed, as required.

I I' designate two bars, which are pivoted at $i\ i'$ upon the forward corners of the frame A, and the front ends of which enter loops $h\ h$ upon the slide H. The rear ends of these bars are formed with laterally-extending cam-sections J J', for a purpose to be hereinafter described.

The carrying-wheels C C' are provided with lateral extensions $c$ upon their peripheries, which serve as markers, said extensions being each of U shape to embrace the inner sides of the fellies, as shown. An oblique brace, $k$, is secured upon the wheel C and is slotted longitudinally, as shown at $k'$, to receive the bracket $l$ of a roller, $l'$. The opposite wheel, C', carries on the inner side of one of its spokes a bracket, $m$, upon which is mounted a roller, $m'$. The wheels C C' are preferably mounted rigidly upon the axle B, in such position that when the roller $l'$ is above the axle the roller $m'$ shall be below the same. As the wheels revolve the rollers $l'\ m'$ engage alternately with the cam-sections J J' of the bars I I', so as to vibrate said bars laterally in unison, and thus reciprocate the slide H, the motions being direct and positive and great leverage being afforded through the bars I I'.

The bar I is really pivoted upon the front end of a swinging arm, N, which is pivoted at $n$ upon the frame A, and said arm carries a lever, O, the front end of which is bent downward, as shown at $o$, to engage a series of sockets, $p$, upon the front of frame A. The object of the arm N and lever O is to vary the throw of the slide and to lock the slide when the latter is not in use.

In lieu of the arm I' and bracket $m$, with its roller $m'$, above described, a cam-plate, $q$, may be mounted upon the wheel C', so as to engage a cam-section, $q'$, upon a lever, $I^2$, said lever being pivoted at $r$ upon a short bar, $s$, which is slotted at $s'$ to receive a bolt, $s^2$, for holding the plate adjustably upon the frame A.

The general operation of the machine is similar to that of other machines of this class, and need not, therefore, be particularly described.

The machine is very accurate and rapid in its action, each marker coming exactly over the point where the seed has been deposited, so that the seed may be properly planted.

Having thus described my invention, what I claim as new therein, and desire to secure by Letters Patent, is—

1. The combination, with the main frame A and its carrying-wheels C C', having the rollers l' m', of the slide-operating lever I', pivoted at i' upon the frame and having the curved end J, the pivoted bar N, having the locking-bar o, and the slide-operating lever I, pivoted upon the forward end of the bar N and having the curved end J', all substantially as and for the purposes described.

2. The combination, with the carrying-wheels, of the U-shaped markers c, embracing the inner sides of the fellies and formed each in a single piece, as shown and described.

3. The combination, with the carrying-wheel and its slotted brace k, of the bracket l, set adjustably in the slot and carrying the roller l', as specified.

In testimony whereof I affix my signature in presence of two witnesses.

JOHN FLYNN.

Witnesses:
 JAMES McANDREW,
 R. L. BARNS.